C. M. PERDEW.
PLEASURE RAILWAY.
APPLICATION FILED APR. 24, 1909.

931,705.

Patented Aug. 17, 1909.
6 SHEETS—SHEET 1.

Witnesses:
Mabel J. Wilks.
Florence Hammel

Inventor
Clarence M. Perdew

C. M. PERDEW.
PLEASURE RAILWAY.
APPLICATION FILED APR. 24, 1909.

931,705.

Patented Aug. 17, 1909.
6 SHEETS—SHEET 4.

Witnesses:
Mabel J. Willis
Florence Hammel

Inventor
Clarence M. Perdew

C. M. PERDEW.
PLEASURE RAILWAY.
APPLICATION FILED APR. 24, 1909.

931,705.

Patented Aug. 17, 1909.
6 SHEETS—SHEET 6.

Witnesses:
Mabel G. Willis.
Florence Hammel

Inventor
Clarence M. Perdew

UNITED STATES PATENT OFFICE.

CLARENCE M. PERDEW, OF CINCINNATI, OHIO, ASSIGNOR TO JACKSON W. SPARROW, OF CINCINNATI, OHIO.

PLEASURE-RAILWAY.

No. 931,705.　　　　Specification of Letters Patent.　　　Patented Aug. 17, 1909.

Application filed April 24, 1909. Serial No. 491,995.

*To all whom it may concern:*

Be it known that I, CLARENCE M. PERDEW, a citizen of the United States, residing at Cincinnati, in the county of Hamilton and State of Ohio, have invented certain new and useful Improvements in Pleasure-Railways, of which the following is a specification.

My invention relates to pleasure railways and the object is to provide a device of this character which will afford amusement in the form of a ride of considerable length, accompanied with a series of novel sensations, and to render such a device safe for the passengers, and durable and economical to construct and operate, while performing the above functions of amusement in a positive and more efficient manner.

My invention consists in the combination with the curved track, of a car having a rotatable body and guiding means to engage with part of the track, and to engage with the body to rotate it, when the car runs around the track.

My invention also consists in the parts and in the details of construction and arrangement of parts as will hereinafter be more fully described and claimed.

My improvement involves the use of a car having a truck which has truck wheels to run on track rails, carrying the weight of the car, laterally disposed guiding wheels which bear against side rails of the track to guide the car along the track, and a body rotatable on the truck. The track upon which the car is adapted to run while performing the desired function of amusement is downwardly inclined and confined to a single plane of inclination, being sinuated in this plane, each sinuation consisting in an arc of a circle and a tangent to this arc. When the car runs around the part of the track conforming to the arc of a circle it will be under the influence of centrifugal force and will exert considerable pressure on the outside of the track, but as soon as it begins to run on the part of the track following the tangent the centrifugal force will cease to exist. The rotation of the body of the car when it runs around the curved part of the track, combined with the constant variation of the axis of rotation, due to the track following a single plane of inclination and being sinuated in this plane, creates a novel sensation upon the passengers in the car. In order to make such sensation most effective it is desirable to allow the car to run at high speed down the track around the sinuations and to permit it to run smoothly, and provide for smooth rotation of the body without highly noticeable bumps or jars, either at the beginning or ending of the rotation. Obviously, it is also desirable to obtain rotation of the body during as much of the period while the car is running around the curve as is possible. This smooth running of the car and rotation of the body is attained by taking advantage of the outward pressure, due to the centrifugal force of the car, to cause the rotation of the body, pivoting the guide wheels on the truck, allowing them to yield to engage with part of the body when they come into opposition with the centrifugal force. Since this force is acting throughout the travel of the car around the curve, it will be seen that the guide wheels will be caused to engage with and rotate the body during such period, but when the car reaches the tangent, and the force no longer acts, the wheels will not be caused to engage with the body and the body will thus be allowed to stop. The successive sinuations being alternate in direction, the car will be under the action of centrifugal force in opposite directions alternately as it passes from each sinuation to the next one. By providing guide wheels on the opposite sides of the car, bearing in opposite directions against opposite sides of the track, these wheels will, of course, rotate in opposite directions. Consequently, if the car is subjected to the action of centrifugal force alternately in opposite directions, guide wheels on opposite sides will alternately engage with the body to rotate it, and, these guide wheels on opposite sides being rotated in opposite directions, the body will also be rotated in opposite directions alternately. With the absence of the centrifugal force, when the car is running on the tangents, the tendency of the car will be to run in a straight line and not to engage its guiding wheels on either side with its rotatable body. By providing springs to resist the pressure tending to engage the guiding wheels with the body, this tendency is further increased, and by providing means for adjusting these springs, the rotating action of the guiding wheels on the body may be regulated by increasing or decreasing the pressure with which they may engage the body.

In order to insure the stoppage of rotation of the body while the car is traveling along the tangent, the car may be provided with a brake under the action of a spring which causes the brake to normally engage with part of the body and hold the body stationary, and the guide wheels in their movement to engage with the body may be caused to disengage the brake from the body, through the medium of connections under the control of the springs which resist the action of the centrifugal force on the guiding wheels. Thus the engagement of the brake with the body will be insured as soon as the centrifugal force ceases to act.

As illustrated in the drawings, the nucleus of the truck frame consists in a ring 11 formed of a structural angle bent to a circle with one leg vertical and the other leg forming a horizontal outwardly extending flange 11'. This flange is the bottom of the ring and constitutes the means for attaching the running gear of the truck, which is done by means of four pedestals 12, one of which is mounted on each side of the truck ring 11 near each end of the truck, and each of which comprises a hub part 12' with a vertical opening therethrough and a horizontal web 12'' which is bolted to the lower side of said horizontal flange 11' of the truck ring 11. Pins $12^a$ pass through the vertical openings in the hubs 12' and an arch bar 13 extends from the lower part of the hub at one end up to the lower side of the horizontal flange 11' of the truck ring midway between the pedestals, and down to the bottom of the hub of the pedestal 12 at the other end, on each side of the truck. These reinforce the pedestals lengthwise of the truck. Cross bars 14 extend transversely of the truck, one of these being at each end and extending from the bottom of the pedestal on one side at that end to the bottom of the pedestal on the other side. These reinforce the pedestals transversely of the truck. Both the arch bars and the cross bars are attached to the pedestals by means of the pins $12^a$. In order to bring the pedestals around on the sides of the truck, those on the same side are placed considerably nearer together than are those on opposite sides, so that a considerable length of the truck ring is left unsupported by these pedestals at each end of the truck. To partially support these parts of the truck ring a fore-and-aft brace 15 extends horizontally between the cross-bars longitudinally of the truck and extends up at each end to be attached to the truck ring. This attachment is made by means of an end bracket 16 at each end of the truck bolted to the horizontal flange of the truck ring. Pins 16' extend through the end brackets and through the fore-and-aft brace near its end. Buffer bars 17 are also pivoted on the pins 16' in the end brackets, extending outward from the ends of the truck and bent downward vertically to have brackets 17' placed behind these vertical parts, with arms extending outward past them, on which are mounted facings 17''. Tension bolts $17^a$ have their heads abutting against the vertical parts of the buffer bars and extend through these parts and through the brackets 17', and these tension bolts have helical springs $17^b$ around them, compressed between the brackets and washers $17^c$ held on the tension bolts near their ends by means of nuts and lock-nuts. Thus, when an impact is received on the facing 17'' of the buffer, the springs will be compressed, cushioning the impact and relieving the truck frame of the strain which would be imposed thereby.

For carrying the car to the high part of the track after it has reached the low part, an elevator is provided, comprising a sprocket chain 1 with lugs 1' mounted on some of its links. An auxiliary chain 2 is also provided running horizontally at the approach to the elevator and it is provided with lugs 2'. This chain runs with the same speed as does the chain 1 and is designed for receiving the car and bringing it to the speed of the main chain 1 before the car starts up the elevator. To form a means for the lugs 2' of the chain 2 to engage with the car, a pivoted fork 18 is mounted on the lower side of one of the crossbars 14 at one end of the truck, being pivoted on a pin 18' passing through a bracket 18'' at one side and through the main fork 18$^a$ at the other side, which bracket and main fork are rigidly secured to the under side of the cross bar. This pivoted fork normally hangs vertically, but is yieldable backward with respect to the direction in which the car is traveling, so that when it strikes the lug 2' on the chain 2 it may pass over it, but is not yieldable from its vertical position forwardly, in the direction in which the car is traveling, so that a lug 2' approaching it from the rear will carry the car along by means of its engagement therewith. The main fork at one side is provided for the engagement of the lugs 1' on the main chain 1 to carry the car up the elevator. The crossbars 14 also form the means for attaching the skids 19, which extend longitudinally of the truck. These consist of boards with flat sides presented downwardly to be engaged by braking mechanism 3, with which the track is provided at the termination of the downwardly inclined part, to stop the car to be unloaded and loaded.

To enable the car to smoothly follow the sinuations of the track on its downward travel it is provided with casters 20, which are pivoted to swing laterally on the pins 12$^a$ in the pedestals 12, and extend outward endwise of the truck. As illustrated, each caster comprises a straight upper bar and a downwardly arched lower bar approaching each other at the ends, and a head block bolted between the bars in the middle. Where the bars approach at one end they are pivoted to the under sides of the pedestals on the pins 12$^a$, and preferably embrace the ends of the arch-bars where they are attached to the pedestals. A spindle 24 is secured in the head block on each caster and extends horizontally inward. A truck wheel 25 is journaled on each spindle, which truck wheel carries the weight of the car. Preferably each caster is provided with a brace 26, extending from near the outer end of the caster, at its top, up to the top of its pedestal, being also pivoted on the pin 12$^a$ in the pedestal. Where the other ends of the upper and lower bars approach, links 27 are embraced between them and pivoted thereto, and extend inwardly and upwardly to form the attaching means for guiding the truck wheels.

Figure 1:
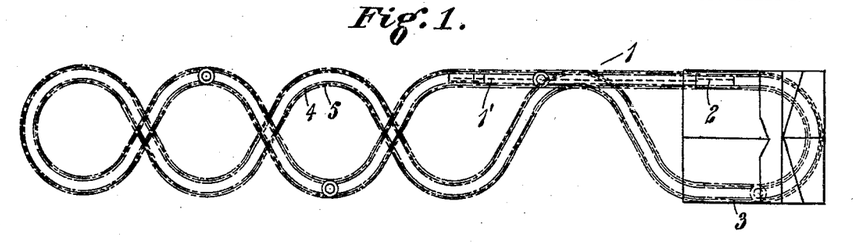
Figure 1. is a plan of a track adapted for embodying my invention, the parts of the track being shown in dotted lines for the sake of clearness.
Figure 2:
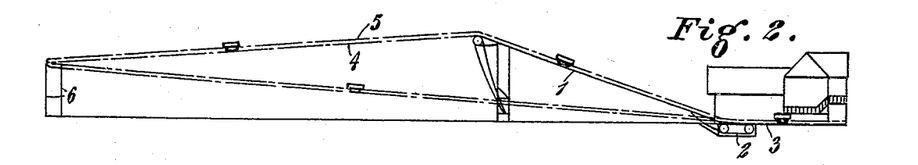
Fig. 2. is a side elevation of the same, similarly showing the parts of the track in dotted lines.
Figure 3:
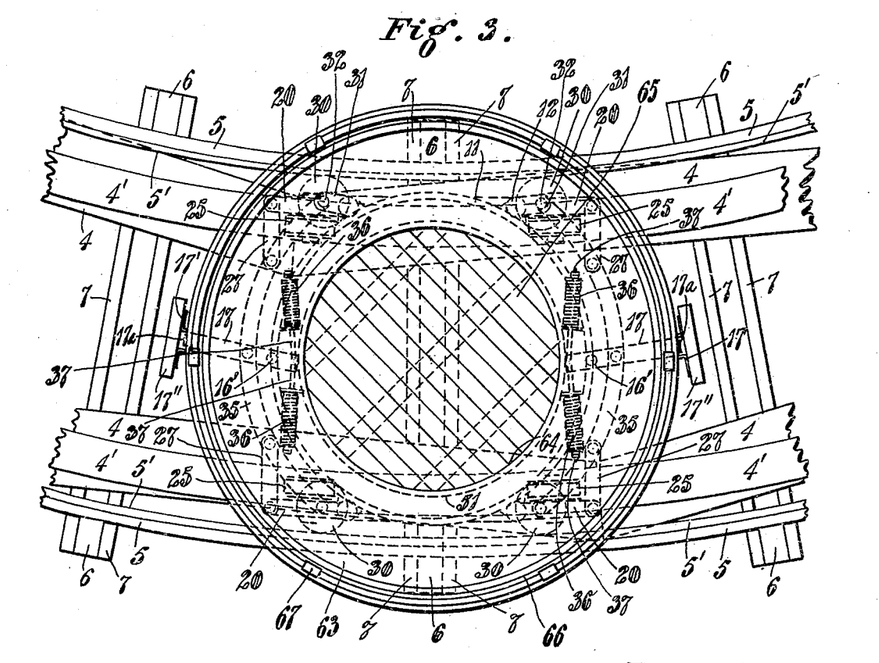
Fig. 3. is a plan view of a car and part of the truck, the principal operative parts only being shown, for sake of clearness.
Figure 4:
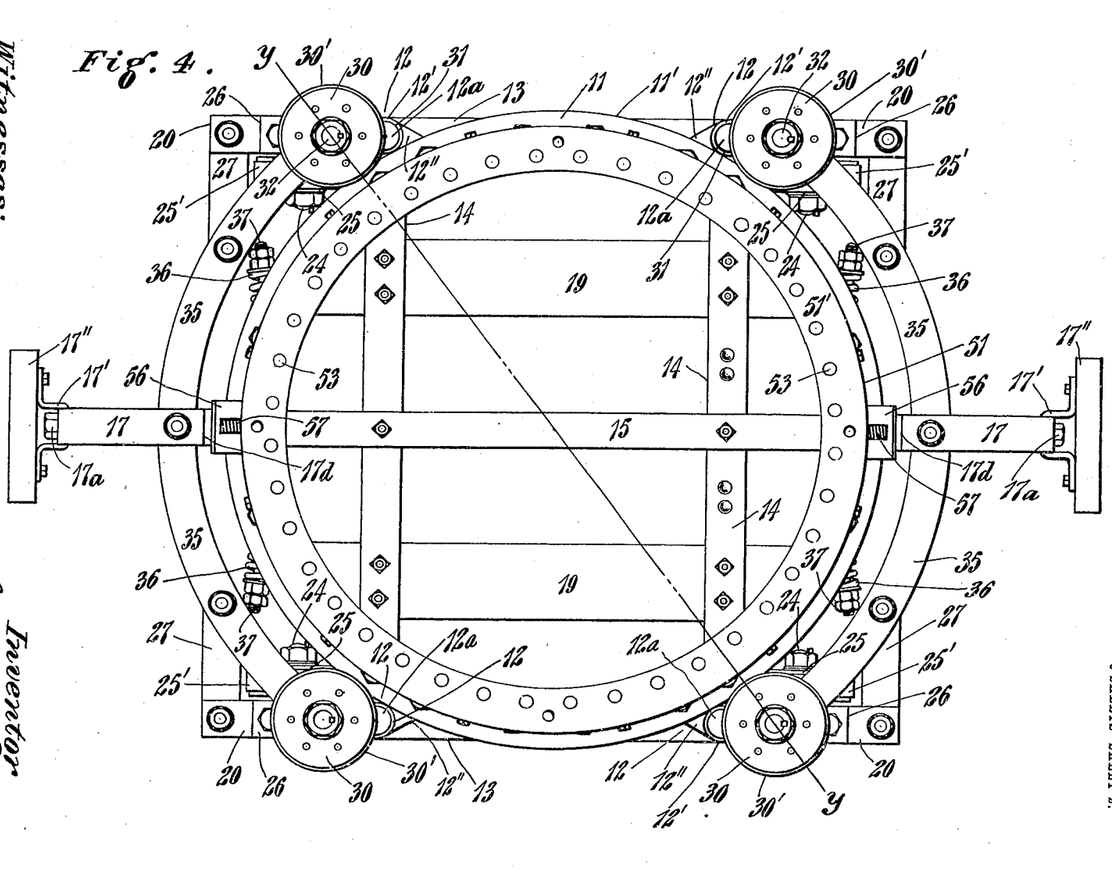
Fig. 4. is a plan view of the truck with the ring for supporting the body thereon, the body being removed.
Figure 5:
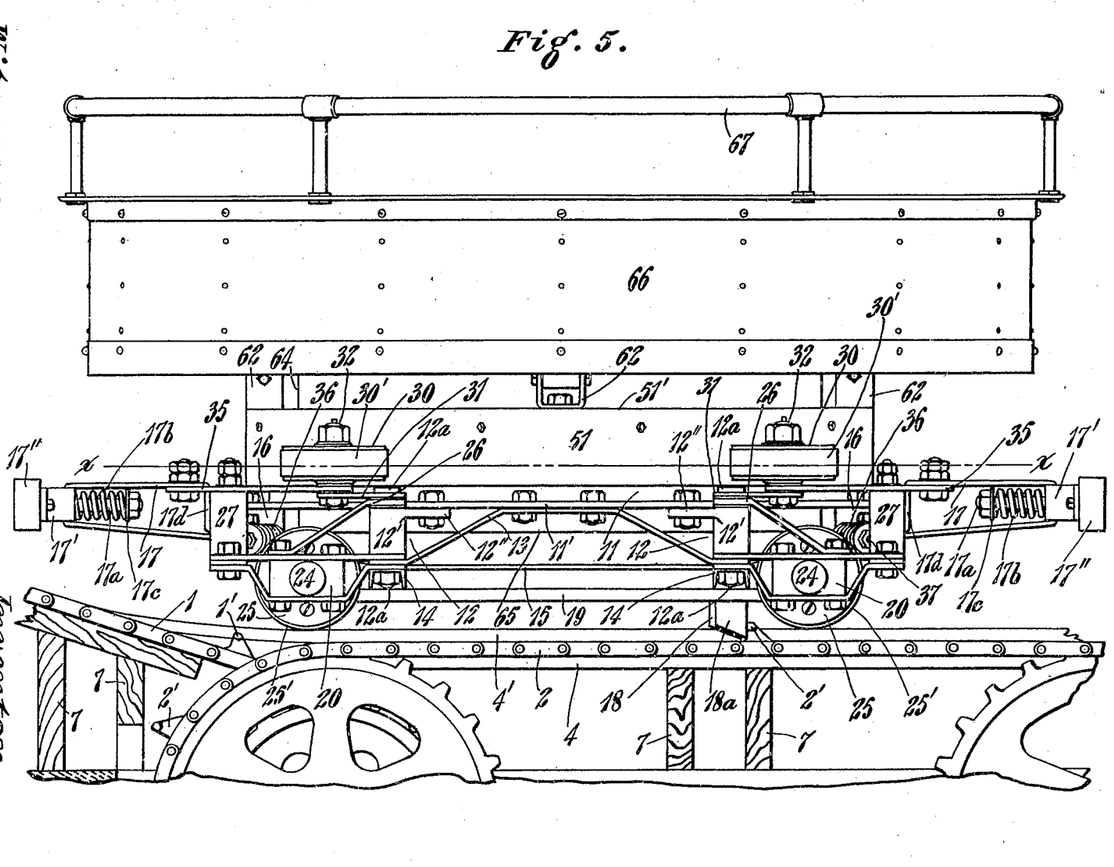
Fig. 5. is a side elevation of a car and part of the track in the region of the propelling mechanism, the part of the track being shown in section.

The guiding of the truck wheels, as well as the guiding of the entire car, is accomplished by means of the guide wheels 30, which are mounted on arms 31, being journaled on spindles 32 in the arms. Connecting bars 35 are also pivoted on these vertical spindles below the guide wheels, one of these connecting bars being at each end of the truck and connecting the spindles of guide wheels at opposite sides of the truck at that end. To these connecting bars the links 27 of the casters are pivotally attached. The arms 31 are pivoted on the pedestals 12, also by means of the pins 12$^a$ therein, so that these arms may swing laterally. Thus, the guide wheels may rotate on their vertical spindles and at the same time swing laterally on their arms and the lateral swinging of a guide wheel on one side at each end will be communicated to the guide wheel on the other side at that end, and, if the guide wheel on one side swings laterally outward, the guide wheel on the other side will swing inward. The casters 20, being connected to the connecting bars 35 of the guide wheels 30 by means of links 27, the lateral swinging will also be communicated to the casters. However, the distance between the pivotal connections of the links 27 to the casters 20 and the pivotal connections of the casters 20 to the pedestals 12 is greater than the distance between the pivotal connections of the connecting bars 35 to the arms 31 and the pivotal connections of the arm 31 to the pedestals 12, so that the angle through which a caster swings will be less than that through which an arm swings. This differential movement of the casters and the arms, with the parts properly proportioned, results in bringing the truck wheels at a tangent to the curve around which the car is running, by means of the engagement of the guide wheels with the sides of the track. The connection of the buffer bar with the guide wheels, by means of the connecting bar, causes the buffer comprised by the bracket and the facing thereon to be presented approximately transversely of the track when the car runs around the curve, as is best shown in Fig. 3 of the drawings.

Figure 9:
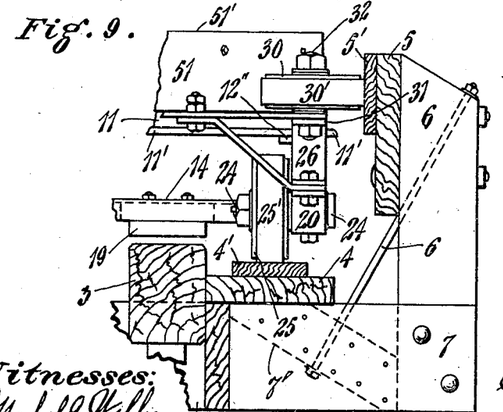
Fig. 9. is a cross-section of part of the track and an end elevation of part of the car, illustrating the combination with the car of the braking mechanism in the track.

The track to accommodate the truck thus constructed comprises bottom rails 4 with facing rails 4' and side rails 5 with facing rails 5'. The side rails are bolted to vertical posts 6 and the bottom rails are carried on transverse ties 7 bolted to the vertical posts 6 at their ends. In order to enable the posts to resist the side thrust of the car, they may be stayed to the ties. If required, the posts may be stayed to the ties as illustrated in Fig. 9 of the drawings, where a packing piece 7' is secured between the two ties 7 flanking the post 6, and a rod 6' passes through the packing piece and through the top part of the post, being secured at its ends against lengthwise movement. The packing piece 7' is under the bottom rail 4 so that lateral displacement by the car of the upper end of the post will be resisted by the bottom rail, on which the car is supported, adding part of the weight of the car to this resistance. The truck wheels 25 run on the facings 4' and the guide wheels 30 bear laterally against the facings 5'.

Figures 6, 7:
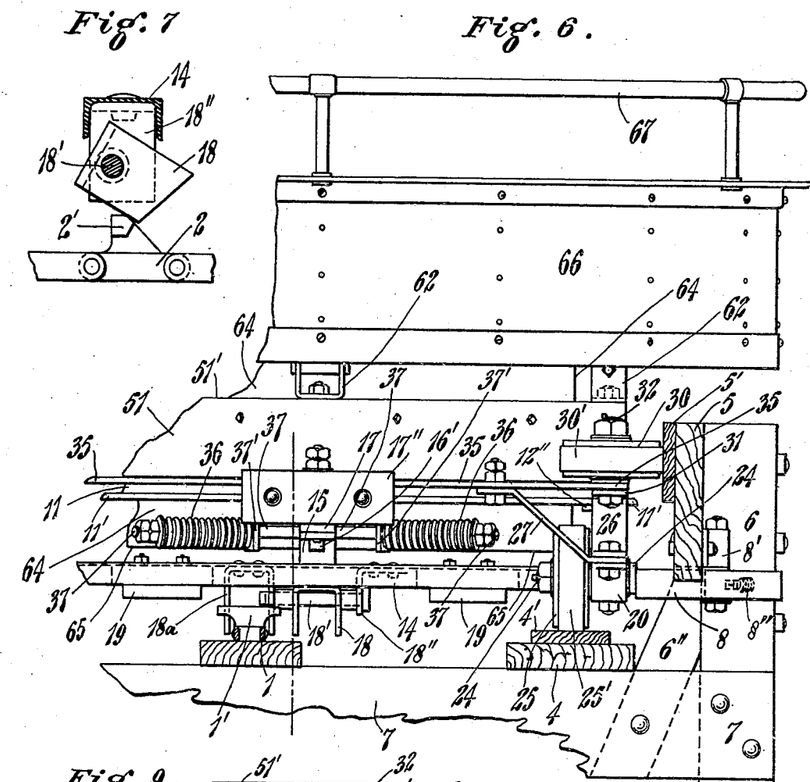
Fig. 6. is a partial end elevation of a car and a cross-section of the track in its straight inclined part.
Fig. 7. is a detail view, enlarged, illustrating the operation of the pivoted fork.
Figure 8:
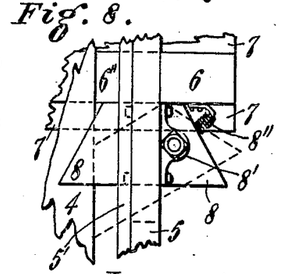
Fig. 8. is a plan view of part of the track provided with a safety catch.

The part of the track provided with the elevator may be constructed as illustrated in Fig. 6 of the drawings with a stay 6" bolted between the ties 7 and bolted to the post 6 under the side rail 5. In order to prevent backward running of the car down the part of the track provided with the elevator, should it become disengaged from the lug 1' on the chain 1, with disastrous results, this part of the track is provided with safety catches 8, each pivoted to swing horizontally under the side rail 5 on a bracket 8' bolted to the outside of the side rail, adjacent to one of the posts 6. Each catch is prevented from swinging down the track by engagement with the post 6, adjacent to which it is mounted, and with the stay 6", bolted to the post. However, the stay is yieldable to swing up the track and, preferably, is normally held down against the post and stay by means of a suitable spring 8" interposed between it and the post outside the track, as is best shown in Fig. 8 of the drawings. Thus the safety catch 8 will normally be held back in the track but will yield to allow the car to pass by, being engaged by the casters 20 of the truck at the ends thereof. The space between the casters on each side being open, these safety catches will also be allowed to enter behind the forwardmost casters of the truck and to resist any backward movement of the truck by engagement behind the casters as well as at the rear end of the truck. Thus the opportunity for engagement of the safety catches is doubled.

The differential swinging of the truck wheels and the guide wheels takes place in such a manner that the truck wheels act as pivots on which the entire car swings toward the outside of the curve due to the action of the centrifugal force generated by the passage of the car around the curve. To resist the action of the centrifugal force, and bring it under control, helical springs 36 are provided, surrounding tension rods 37 which pass through downwardly extending lugs 37' on the end brackets 16. The buffer bars 17 are pivotally connected to the connecting bars 35 so that they will be swung laterally when the guide wheels swing laterally, pivoting on the pins 16' in the end brackets. These buffer bars extend inwardly of the truck past these pins on which they are pivoted, between the lugs 37' on the end brackets, and the tension rods 37 are connected to them near their inward ends so that one of said tension rods extends horizontally therefrom in each direction. These tension rods have washers and nuts and lock-nuts on their ends, between which and the lugs 37' on the brackets, the helical springs 36 are compressed. Thus, movement of the buffer bar, and of the guide wheels and truck wheels, which are connected to the buffer bar, in either direction, is resisted by one of these springs, movement to the right being resisted by the spring on the left side, and movement to the left being resisted by the spring on the right side. The resistance of these springs may be adjusted by means of the nuts on the tension rods, so that any centrifugal force encountered may be caused to produce the degree of pressure required for properly rotating the body of the car.

The body ring 51 is formed of an angle bent to a circle with one leg extending horizontally inward to form a flange 51' at its top, and having its other leg extending vertically downward. It is against the outer convex surface of this vertical part of the body ring 51 that the peripheries of the guide wheels 30 bear when they are swung laterally, the frictional contact of these wheels in rotation, due to their rolling along the facings 5', resulting in the rotation of the body, and the alternate engagements of the wheels on opposite sides of the car resulting in the alternate rotation of the body, as hereinbefore referred to. This body ring 51 is of such diameter that its vertical part may surround the vertical part of the truck ring 11 and leave considerable space therebetween, the horizontal inwardly extending flange of the body ring extending inward over the vertical part of the truck ring. A bearing ring 52 is mounted on the upper edge of the vertical part of the truck ring 11. This bearing ring as here shown consists in an angle bent to a circle with a horizontal leg extending outward, which lies over the upper edge of the truck ring, and a vertical leg extending downward, which fits inside the truck ring and is bolted thereto. Rollers 53 are mounted on the lower side of the horizontal inwardly extending flange of the body ring and roll on the upper side of the horizontal leg of the bearing ring to carry the weight of the body when it rotates. Other rollers 53ª are mounted on brackets 54 on the outer side of the vertical part of the truck ring 11 and bear against the inner side of the vertical part of the body ring 51. These resist the side-thrust.

The brake for stopping the rotation of the body, as hereinbefore referred to, consists in a bracket 55 secured to the vertical part of the truck ring 11 at the end of the truck, and a shoe 56 pivoted on this bracket to swing in a vertical plane outward endwise of the car. Each shoe is provided with a helical spring 57 which tends to press the shoe outward. Pressed outward, this shoe normally engages with the inner side of the body ring 51. The buffer bar 17 lies over the connecting bar 35 where it is pivoted to it, and is bent down inside of said buffer bar to come under the end bracket so that it thus has a vertical part 17$^d$. This vertical part 17$^d$ is adapted to engage with the shoe 56 of the brake when the buffer bar is swung sidewise, but is out of engagement with the brake when the buffer bar occupies its middle position while the car is traveling in a straight line. The engagement of this vertical part 17$^d$ of the buffer bar with the shoe 56 of the brake serves to disengage the shoe from the inside of the vertical part of the truck ring 51 against the pressure of the helical spring 57, but, as soon as disengagement of the vertical part 17$^d$ and the shoe 56 takes place, the spring 57 will immediately act to engage the shoe 56 again with the vertical part of the ring 51. Thus the ring, and the body mounted thereon, will be held stationary except when the guide wheels engage with the ring to rotate the body. These brakes are provided at both ends of the truck, so that their constant pressures on the body ring may neutralize each other.

Figures 10, 11, 12, 13:
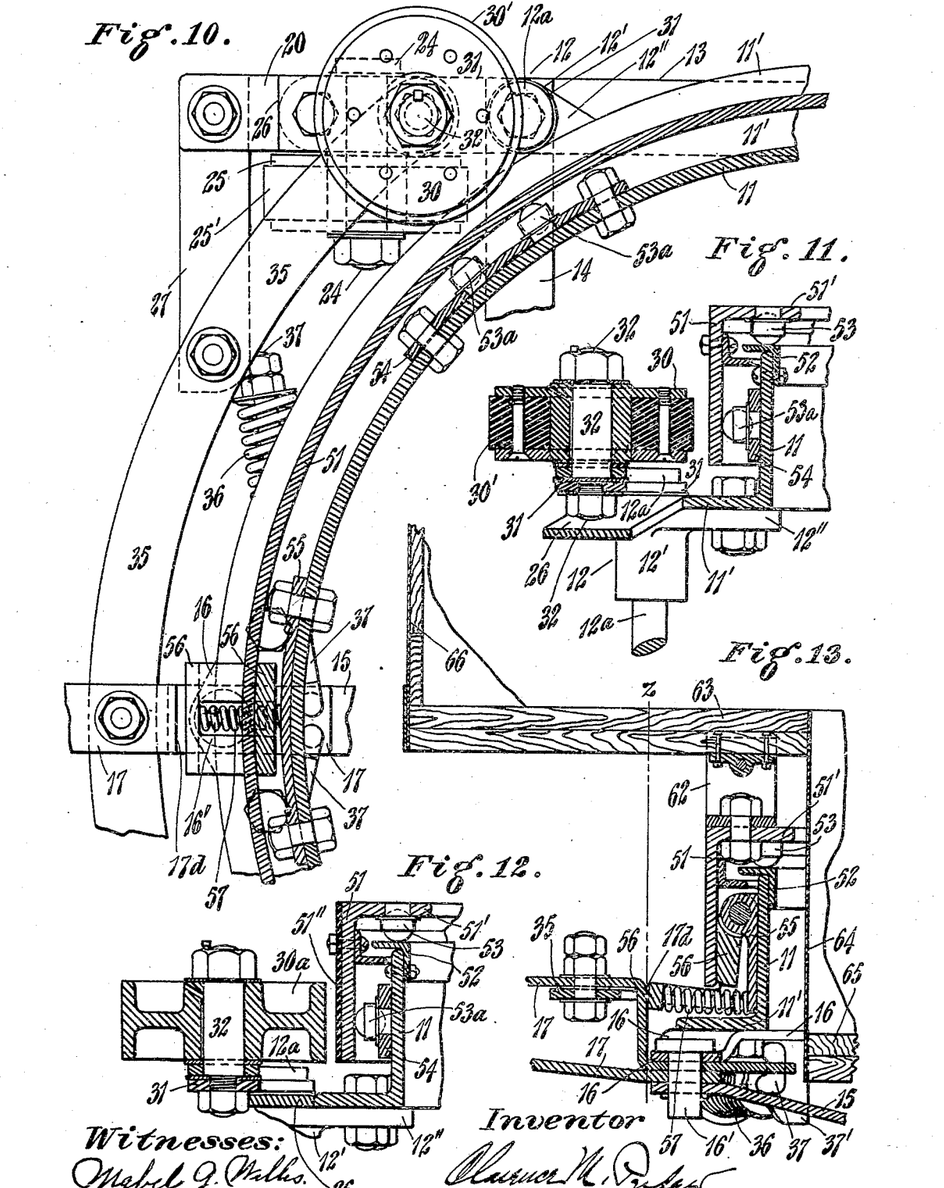
Fig. 10. is a horizontal cross-section of part of the truck on a line corresponding to the line $x$—$x$ of Fig. 5.
Fig. 11. is a vertical section of part of the truck on a line corresponding to the line $y$—$y$ of Fig. 4.
Fig. 12. is a vertical section similar to Fig. 11, illustrating a modification of the friction transmitting means for rotating the body.
Fig. 13. is a vertical longitudinal section through part of the truck and part of the body to illustrate the construction of the brake and of the means for attaching the body to the ring.
Figures 14, 15, 16:
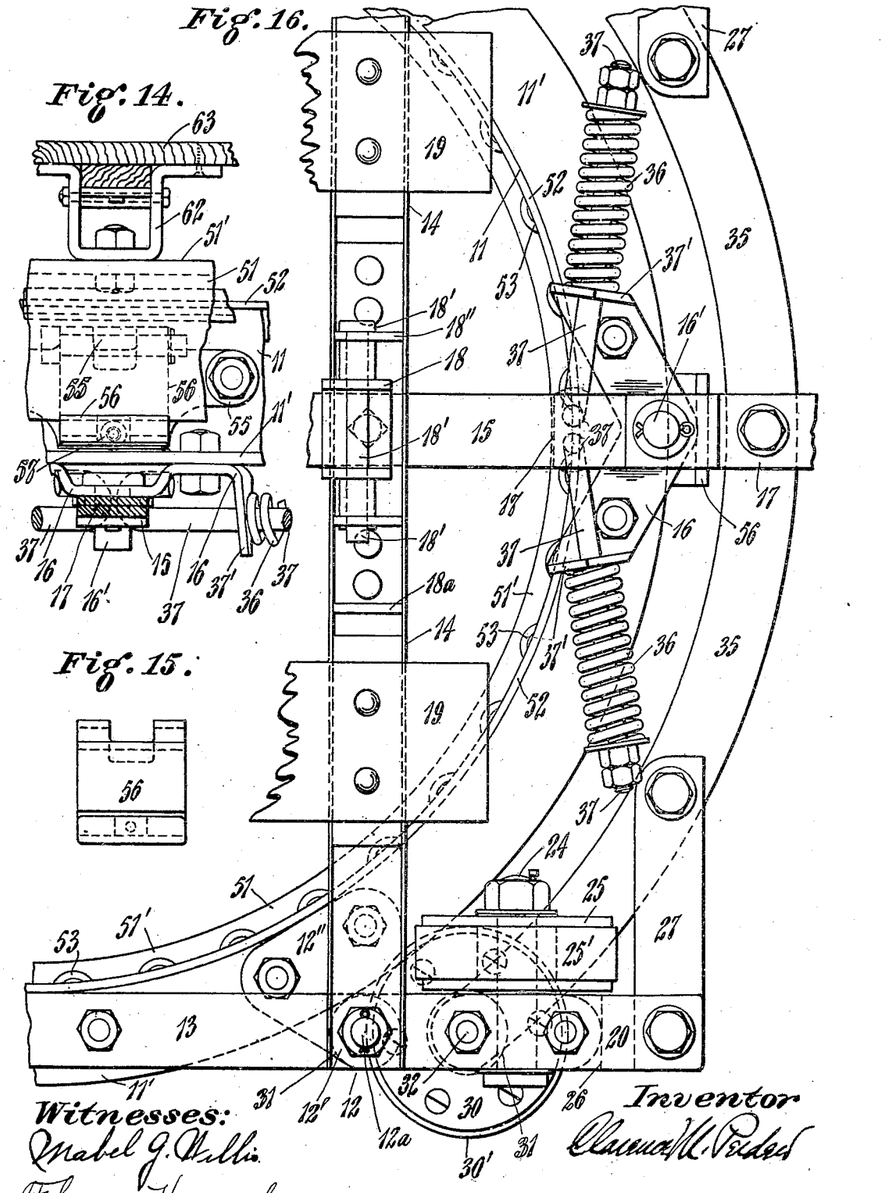
Fig. 14. is a cross-section on a line corresponding to the line $z$ of Fig. 13.
Fig. 15. is a detail end elevation of the brake shoe.
Fig. 16. is a bottom plan view of part of the truck.

In order that the guide wheels 30 may efficiently engage with the body ring 51 to rotate it, they are preferably provided with non-metallic treads 30′ to engage with the ring. Such non-metallic treads are also useful in reducing the wear on the facing rails 5′, and for this reason the truck wheels 25 are also provided with non-metallic treads 25′, which reduce the wear on the facing rails 4′. Where it is desired to use wheels with metallic treads, such as the wheel 30$^a$ illustrated in Fig. 13, the ring 51 may be provided with a non-metallic facing 51″ around the outside of its vertical part for the wheel 30$^a$ to engage with.

As before referred to, the buffer bar 17 lies over the connecting bar 35 where it is pivoted thereto, but takes under the end bracket 16, so that the truck ring 11 in this region may be partly supported by the connecting bar 35 in addition to the support afforded it by the fore-and-aft brace 15. This load in turn is communicated from the connecting bar 35 to the casters 20 through the links 27, which communicate the swinging of the connecting bar to the casters as hereinbefore described. Thus the connecting bar, together with these links and the buffer bar, serves as an additional support for the truck ring at each end, constituting, with the pedestals 12, a series of supports approximately equally spaced around the truck ring, supporting it evenly, as is required to form a firm bearing for the rotation of the body.

The body is secured to the body ring 51 by means of suitable clips 62 bolted to the horizontal part of the body ring. This body comprises a seat 63, having a circular inner edge and a circular outer edge, around the inner edge of which the lower shell 64 is attached, which shell extends downward and has the floor 65 attached to it, forming the compartment for the lower extremities of the passengers. This seat is supported directly over the body ring and it is to the under side of this that the clips 62 are secured to hold the body on the body ring to rotate therewith. The compartment formed by the lower shell and the floor is surrounded by the body ring and extends therebelow, the floor being only slightly above the cross bars and the fore-and-aft brace of the truck frame. To the outer edge of the seat the upper shell 66 is secured, which extends upward therearound and has a suitable rim with a railing 67 secured thereto.

Preferably, all of the parts of the car adapted to withstand strains due to the operation of the device are constructed of steel and iron, the design herein illustrated as an embodiment of my invention being best adapted for the use of such materials. However, it will be understood that various minor departures from the illustration and description contained herein may be made, as is necessary to adapt the construction to varying conditions as regards weights to be carried and kinds of material desired to be used. Therefore, I do not wish to be understood as limiting myself to the specific description and illustrations herein but

What I claim as new and desire to secure by Letters Patent is:

1. In a pleasure railway, the combination with a curved track, of a car having a truck to follow the track, and a body to rotate on the truck, and mechanism actuated by the centrifugal force of the car to engage with the body and rotate it when the car runs around the track.

2. In a pleasure railway, the combination with a curved track, of a car having a truck to follow the track, and a body to rotate on the truck, laterally swinging guide wheels on the truck and means for causing said guide wheels to engage with the body to rotate it when the car runs around the track.

3. In a pleasure railway, the combination with a curved track, of a car having a truck to follow the track and a body to rotate on the truck, laterally swinging truck wheels to carry the weight of the car, laterally swinging guide wheels, and means for connecting the truck wheels and the guide wheels to cause them to move differentially and to cause the guide wheels to engage with the body to rotate it due to the centrifugal force of the car when the car runs around the track.

4. In a pleasure railway, the combination with a curved track, of a car having a truck to follow the track and a body to rotate on the truck, a ring on the truck and a ring on the body adapted to turn on the ring on the truck, truck wheels to carry the weight of the car, and guide wheels pivotally mounted on the ring on the truck to swing laterally and engage with the ring on the body to rotate the body when the car runs around the track.

5. In a pleasure railway, the combination with a curved track, of a car having a truck to follow the track and a body to rotate on the truck, laterally swinging guide wheels on the truck, means for causing the guide wheels to engage with the body to rotate it when the car runs around the track, and means for resisting the engagement of the guide wheels with the body to regulate their rotating action thereon.

6. In a pleasure railway, the combination with a curved track, of a car having a truck to follow the track and a body to rotate on the truck, laterally swinging guide wheels on opposite sides of the truck adapted to engage with the body to rotate it, a connecting bar to maintain the distance between the guide wheels, and a spring connected to the connecting bar to resist the lateral swinging of the guiding wheels and regulate their rotating action on the body.

7. In a pleasure railway, the combination with a curved track, of a car having a truck to follow the track and a body to rotate on the truck, laterally swinging truck wheels to carry the weight of the car, laterally swinging guide wheels adapted to engage with the body to rotate it when the car runs around the track, means for connecting the truck wheels and guide wheels to cause them to move differentially, and means for resisting the movement of said wheels thus connected, for the purposes set forth.

8. In a pleasure railway, the combination with a curved track, of a car having a truck to follow the track and a body to rotate on the track, laterally swinging truck wheels to carry the weight of the car, laterally swinging guide wheels at opposite sides of the car, connecting bars connecting the guide wheels on opposite sides to maintain the distance between them, said guide wheels being adapted to engage with the body to rotate it when the car runs around the track, and links forming connections between the connecting bars and the truck wheels whereby the truck wheels and guide wheels are caused to move differentially.

9. In a pleasure railway, the combination with a curved track, of a car having a truck to follow the track and a body to rotate on the truck, laterally swinging guide wheels adapted to engage with the body to rotate it when the car runs around the track, brackets on the car having buffers extending past the body at the ends, and means for connecting the brackets to the guide wheels to cause them to move in unison therewith for the purposes set forth.

10. In a pleasure railway, the combination with a curved track, of a car having a truck to follow the track and a body to rotate on the truck, laterally swinging truck wheels to carry the weight of the car, laterally swinging guide wheels adapted to engage with the body to rotate it when the car runs around the track, brackets on the car having buffers extending past the body at the ends, and means for connecting the truck wheels and the guide wheels to the brackets for the purposes set forth.

11. In a pleasure railway, the combination with a curved track, of a car having a truck to follow the track and a body to rotate on the truck, laterally swinging guide wheels adapted to engage with the body to rotate it when the car runs around the track, movable brackets on the truck having buffers extending past the body at the ends, means for connecting the brackets to the guide wheels, and springs connected to the brackets to resist the movement of the guide wheels and regulate their rotating action on the body.

12. In a pleasure railway, the combination with a curved track, of a car having a truck to follow the track and a body to rotate on the truck, laterally swinging guide wheels adapted to engage with the body to rotate it when the car runs around the track, a movable bracket on the truck having a buffer extending past the body at the ends, means for connecting the bracket to the guiding wheels, a brake adapted to engage with the body, and means for engagement between said bracket and said brake to disengage the brake from the body when the guide wheels engage with the body.

13. In a pleasure railway, the combination with a curved track, of a car having a truck to follow the track and a body to rotate on the truck, laterally swinging guide wheels adapted to engage with the body to rotate it when the car runs around the track, a brake adapted to engage with the body when the guide wheels are out of engagement therewith, and means for disengaging the brake from the body simultaneously with the engagement of the guide wheels therewith.

14. In a pleasure railway, the combination with a curved track, of a car having a truck to follow the track and a body to rotate on the truck, laterally swinging guide wheels adapted to engage with the body to rotate it when the car runs around the track, a brake to resist the rotation of the body, a connecting bar connected to the guiding wheels, means for engagement between the connecting bar and the brake, and springs to 15. In a pleasure railway, the combination with a curved track, of a car having a truck to follow the track and a body to rotate on the truck, laterally swinging casters on the truck, truck wheels journaled on the casters to carry the weight of the car, laterally swinging arms on the truck, guide wheels journaled on the arms to guide the car and to swing laterally to engage with the body to rotate it when the car runs around the track, and means for connecting said casters and said arms to cause them to move differentially, for the purposes set forth.

16. In a pleasure railway, the combination with a curved track, of a car having a truck to follow the track and a body to rotate on the truck, laterally swinging arms on the truck, guide wheels journaled on the arms to guide the car, and adapted to swing laterally to engage with the body to rotate it, said guide wheels being located on opposite sides of the car, a connecting bar, extending around the body of the car, connecting the arms and the guide wheels journaled thereon to maintain the distance between the wheels, and links connecting the connecting bar to the casters to cause the truck wheels and the guide wheels to move differentially, for the purposes set forth.

17. In a pleasure railway, the combination with a curved track, of a car having a truck to follow the track and a body to rotate on the truck, a ring forming part of the truck, casters and arms pivotally connected to the rings at opposite sides of the car, truck wheels journaled on the casters to carry the weight of the car, guide wheels journaled on the arms to guide the car, a ring on the body adapted to turn on the ring on the truck, the guide wheels being adapted to engage with the ring on the body when the car runs around the track, connecting bars connecting the arms and the guiding wheels journaled thereon at opposite sides of the car, links connecting the connecting bars to the casters, and brackets pivotally connected to the connecting bar and to the ring on the truck, said ring being supported at the pivotal connections of the casters and arms thereof and also at the pivotal connections of the brackets therewith, and a part of the weight of the car being transmitted from said casters through said links and connecting bars and said brackets to said rings where the brackets are pivotally connected therewith.

18. In a pleasure railway, the combination with a curved track, of a car having a truck to follow the track and a body to rotate on the truck, a ring on the body adapted to turn on the ring on the truck, truck wheels to carry the weight of the car, guide wheels pivotally mounted on the ring on the truck to engage with the ring on the body to rotate the body when the car runs around the track, a brake mounted on the ring on the truck and adapted to engage with the ring on the body, and means for causing the brake and the guiding wheels to alternatively engage with the ring on the body, for the purposes set forth.

19. In a pleasure railway, the combination with a curved track, of a car having a truck to follow the track and a body to rotate on the truck, mechanism actuated by the centrifugal force of the car running around said curved track to engage with and rotate said body, and a brake controlled by such actuated mechanism to engage with and limit the rotation of said body.

20. In a pleasure railway, the combination with a curved track, of a car having a truck adapted to run on the track and a body to rotate on the truck, mechanism actuated by the centrifugal force of the car running around the track to engage with and rotate said body, and springs opposing the action of the centrifugal force on said mechanism, whereby the efficiency of the mechanism in rotating the body is limited.

21. In a pleasure railway, the combination with a curved track, of a car having a truck to follow the track and a body to rotate on the truck, a ring on the truck having a horizontal outwardly extending flange and a vertical part, truck wheels to carry the weight of the car, and guide wheels pivotally mounted on the ring, the horizontally extending part of the ring constituting the means for attaching said truck wheels and said guide wheels, a ring on the body having a horizontal inwardly extending flange and a vertical part, the horizontal part being over the vertical part of the ring on the truck and the vertical part being over the horizontal part of the ring on the truck, bearings between the horizontal part of the ring on the body and the vertical part of the ring on the truck to carry the weight of the body when it rotates on the truck, and side-thrust bearings between the vertical parts of the rings, the guide wheels being adapted to engage with the outer surface of the vertical part of the ring on the body to rotate the body when the car runs around the track.

22. In a pleasure railway, the combination with a curved track, of a car having a truck to follow the track and a body to rotate on the truck, a ring on the truck having a vertical part and a horizontal part, truck wheels to carry the weight of the car, and guide wheels pivotally mounted on the ring on the truck, the horizontal part of the ring constituting the means for attaching the truck wheels and the guide wheels, a ring on the body having a horizontal part over the vertical part of the ring on the truck and a vertical part over the horizontal part of the ring on the truck, side-thrust bearings between the vertical parts of the rings, roller bearings between the horizontal part of the ring on the body and the vertical part of the ring on the truck, and a removable bearing ring mounted on the vertical part of the ring on the truck for the roller bearings to roll on, the guide wheels being adapted to engage with the outside of the vertical part of the ring on the body to rotate the body when the car runs around the track.

23. In a pleasure railway, the combination with a curved track, of a car having a truck to follow the track and a body to rotate on the truck, a ring on the truck and a ring on the body adapted to turn on the ring on the truck, pedestals on the ring on the truck, casters pivotally mounted on the pedestals, truck wheels journaled on the casters, guiding wheels pivotally mounted on the pedestals to swing laterally and engage the ring on the body to rotate the body when the car runs around the track, part of the body being surrounded by the ring thereon and extending below said ring, a cross-bar attached to the pedestals and extending below the body, part of the track being straight and provided with propelling mechanism for the car, and means for engagement with said propelling mechanism mounted on said cross-bar, for the purposes set forth.

24. In a pleasure railway, the combination with a curved track, of a car having a truck to follow the track and a body to rotate on the truck, laterally swinging casters on the truck at its ends, truck wheels journaled on the casters to carry the weight of the car, guiding wheels adapted to engage with the body to rotate it when the car runs around the track, the truck having open spaces at its sides between the casters at the ends whereby it is engageable at the ends and between the casters, the track having a straight part which is inclined and having mechanism for propelling the car up said inclined straight part, and laterally swinging safety catches interposed in said inclined straight part of the track, yieldable to the truck when the car is propelled up the track, but engageable with the truck at its ends and between the casters, to obstruct it if the car runs down said straight inclined part of the track.

25. In a pleasure railway, the combination with a curved track, of a car having a truck to follow the track and a body to rotate on the truck, a ring on the truck and a ring on the body adapted to turn on the ring on the truck, pedestals on the ring on the truck, casters pivotally mounted on the pedestals, truck wheels journaled on the casters, guiding wheels pivotally mounted on the pedestals to swing laterally and engage with the ring on the body to rotate the body when the car runs around the track, part of the body being surrounded by the ring thereon and extending below said ring, a cross-bar attached to the pedestals and extending below the body, part of the track being provided with braking mechanism adapted to be raised to engage with part of the car, and a skid running longitudinally of the car and attached to the cross-bar to form the means for engagement with the braking mechanism, for the purposes set forth.

26. In a pleasure railway, the combination with a curved track, of a car having a truck to follow the track and a body to rotate on the truck, a ring on the truck and a ring adapted to turn on the ring on the truck and support the body, the truck having truck wheels to carry the weight of the car and guiding wheels adapted to engage with the ring that supports the body to rotate said body, a lower shell for the body having its sides extending vertically, a floor attached to the lower shell near its lower edge, and a seat rigidly mounted on the ring that supports the body, the lower shell being attached to the seat near the upper edge of said shell, substantially as and for the purposes set forth.

CLARENCE M. PERDEW.

Witnesses:
 JACKSON W. SPARROW,
 FLORENCE HAMMEL.